United States Patent [19]

Turner

[11] Patent Number: 4,819,307
[45] Date of Patent: Apr. 11, 1989

[54] HOSE CLAMP

[76] Inventor: David L. Turner, Department of Engineering, University of Warwick, Coventry CV4 7AL, United Kingdom

[21] Appl. No.: 42,944
[22] PCT Filed: Jul. 15, 1987
[86] PCT No.: PCT/GB86/00408
 § 371 Date: Apr. 24, 1987
 § 102(e) Date: Apr. 24, 1987
[87] PCT Pub. No.: WO87/00602
 PCT Pub. Date: Jan. 29, 1987

[30] Foreign Application Priority Data

Jul. 19, 1985 [GB] United Kingdom ............... 8518277

[51] Int. Cl.[4] ............................................. B65D 63/00
[52] U.S. Cl. .................................. 24/274 R; 24/20 S; 24/279
[58] Field of Search ............... 24/274 R, 274 P, 270, 24/271, 269, 279, 273, 280, 20 S, 20 LS; 285/253

[56] References Cited

U.S. PATENT DOCUMENTS

| 2,155,705 | 4/1939 | Gottwald | 24/271 |
| 2,405,913 | 8/1946 | Tinnerman | 24/274 R |
| 2,472,172 | 6/1949 | Ovens et al. | 24/20 S |
| 2,482,374 | 9/1949 | Ruschmeyer | 24/271 |
| 2,504,836 | 4/1950 | Hill | 24/274 R |
| 2,522,494 | 9/1950 | Baldo | 24/274 R |
| 2,629,908 | 3/1953 | Keck | 24/20 S |
| 2,843,910 | 7/1958 | Mruzek | 24/270 |
| 4,429,847 | 2/1984 | Jablonski et al. | 24/279 |
| 4,489,464 | 12/1984 | Massari et al. | 24/20 LS |
| 4,546,524 | 10/1985 | Kreft | 24/274 R |

Primary Examiner—Victor N. Sakran
Attorney, Agent, or Firm—Scully, Scott, Murphy & Presser

[57] ABSTRACT

A clamp for securing a hose on a pipe end has a band (4) which encircles the hose with one end (6) of the band overlying the other end (7) in sliding engagement, a housing (8) which is fixed to one band end (6), a worm drive (10) within and free to move relative to the housing (8) and which engages a toothed track or like which runs longitudinally along the length of the band (4), and a stack of Belleville washers or like (20) which acts between the housing (8) and the worm drive (10) to urge them apart and so to tighten the band around the hose should the tension fall below the limit set by manual operation of the worm drive at the time of installation.

11 Claims, 3 Drawing Sheets

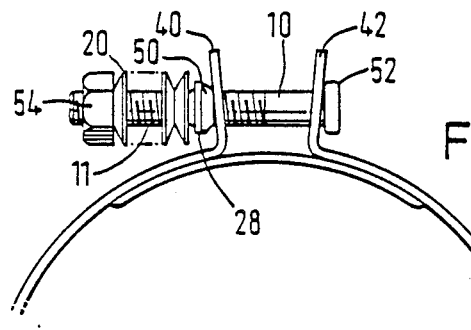
FIG. 6
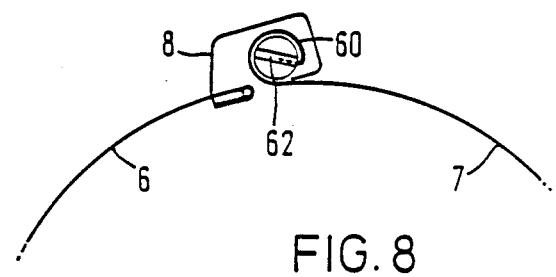
FIG. 8
FIG. 7
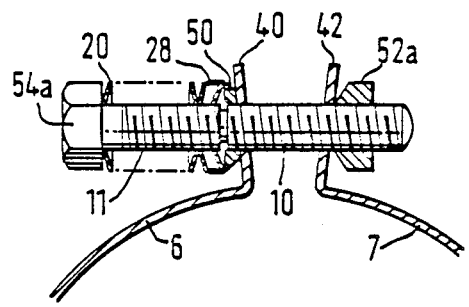
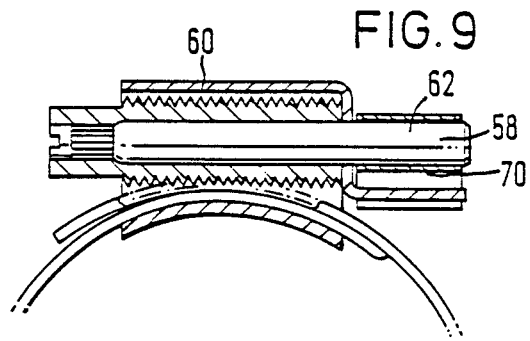
FIG. 9

HOSE CLAMP

This invention relates to a hose clamp for connecting flexible hoses to inflexible pipes, spigots, nipples or the like, to give a liquid-tight connection between the two.

Although the hose clamps of the invention may find application for the connection of hoses carrying low pressure supplies such as the water supplies to domestic washing machines and the like, the main intended of application is in medium pressure environments where the pressure may be around 30 to 50 lbs/sq. inch, such as is found in the cooling and lubricating systems of trucks and railway engines. Currently available clamps of the type aforesaid suffer from the disadvantage that the period for which they maintain liquid-tight connection is limited and that period is of uncertain duration and depends, at least in part, on the amount of usage to which the clamp has been subjected. It is, therefore, necessary that clamps in use be installed in an overtightened condition, routinely retightened or that they be periodically inspected an retightened as may be found necessary. None of these approaches is entirely satisfactory: initial overtightening may damage the hose and cause leakage and routine inspection and retightening is time-consuming and expensive in manpower costs. In any case, even with routine inspection, leaks may occur between inspections and may only become manifest when the vehicle is about to begin duty leading to delay and its associated expense.

An object of the present invention is to obviate or mitigate the aforesaid disadvantages.

According to the present invention there is provided a hose clamp comprising a loop for encircling and clampingly engaging an overlapping junction between a hose and a pipe end extending into the hose, disengageable means resisting enlargement of the loop diameter and self-adjusting means for reducing the loop diameter in response to relaxation of tension in the engagement between band and hose below a preselected value.

Thus the clamp will be tightened if the tension falls below a preselected value by shortening of the circumference of the loop to reduce its diameter. Slackening of the clamp is resisted by, for example, a ratchet arrangement, facility for disengaging the resisting means being provided to permit fitting and removal of the clamp but, in use, only unidirectional movement in the direction which tightens the clamp is permitted.

Preferably, the loop is a circle of metallic wire having a spring bias towards a diameter smaller than that of the hose, said loop having contiguous overlapping portions provided with mutually engaging ratchet teeth to resist enlargement of the diameter of the loop. Free end portions of the circle may have radially outturned lugs to facilitate disengagement of the ratchet for installation and removal of the loop.

Alternatively, the hose clamp may comprise a circular hose-encircling band having contiguous overlapping end portions and a generally centrally located toothed or sprocketed track running longitudinally along the length of the band, a rotatable worm drive engaging the track and providing the means for tightening and resisting slackening of the band and including self-acting means for tightening the band in response to relaxation in the engagement between band and hose.

In another embodiment of the invention, a hose clamp comprises a hose-encircling band, a frictional roller mounted on one free end of the band and frictionally engaging the other free end and means for tightening the band by drawing one free end past or winding around the roller.

This invention is particularly, but not exclusively, concerned with the prevention of leaks which occur axially from the junction between hose and pipe and is based on observations of the timing of the occurrences of such leaks. It has been observed that axial leakage appears to occur after a period of non-use of the installation, for example, at first start-up after a weekend shutdown. The invention is also based on the discovery that the leaks are caused by gradual creep of the material of construction of the hose. This creep is particularly noticeable in radiator and cooling oil systems where the hose is subjected to elevated temperatures for prolonged periods before cooling. It is believed that expansion of the hose when hot tends to cause the hose to creep relative to the hose clamp and pipe, whereas contraction upon subsequent cooling does not reverse the creep and so results in the internal surface of the hose and the external surface of the clamp tending to separate, that is there is radially outward movement of the hose relative to the pipe.

The invention will now be described, by way of illustration, with reference to the accompanying drawings, of which:

FIG. 6 is an end elevation of a fourth embodiment of the invention with upstanding lugs draw together to tighten the clamp;

FIG. 7 is a modified version of the fourth embodiment shown in FIG. 6;

FIG. 8 is a fifth embodiment of the clamp of the invention;

FIG. 9 is a sixth embodiment of the invention which utilises an alloy to provide the self-acting tightening of the clamp.

Figure 1:
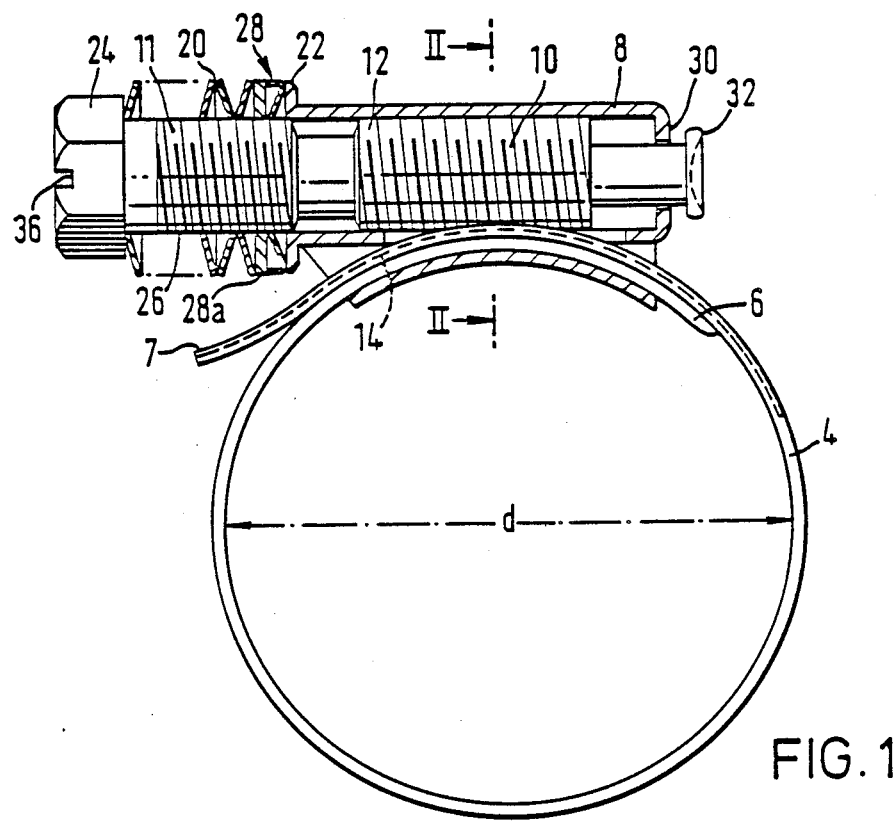
FIG. 1 is a part sectional end elevation of a first embodiment of the hose clamp of this invention.
Figure 2:
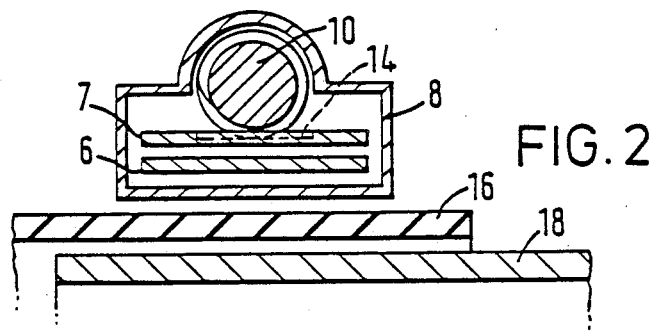
FIG. 2 is a sketch of a view along the line II—II shown in FIG. 1, in the direction indicated by the arrows, adjacent a hose and pipe overlap joint.

Referring to FIGS. 1 and 2 a hose clamp 2 comprises a flexible metal band 4 having a first end 6 and a second end 7. First end 6 has secured to it a housing 8 holding a clamp actuating member 10. Second end 7 engages the part of the radially outer surface of first end 6 so that the band 4 is formed into generally circular configuration, and also operatively engages the clamp actuating member 10. The aforesaid parts may be of known, conventional structure, with the clamp actuating member 10 being rotatable in the housing 8 and having screw threads 12 engageable with slots, recesses or projections 14 on the second end 7 and disposed at a small angle to the axis of the band when in a circular configuration; such that rotation of the member 10 in one rotational direction causes the second end 7 to be drawn through the housing 8 to reduce the diameter of the circular configuration and so tighten the band 4 around a hose 16 and pipe end 18 and, conversely, when rotated in the opposite direction the engagement between band 4 and hose ad pipe 16,18 is slackened permitting removal of the band 4 from the hose 16.

The radially inner surface of the end 6 and the radially outer surface of end 7 are in sliding contact, the radially inner surface of the end 6 and the housing 8 mounted thereupon are in tight, fixed engagement, the outer surface of housing 8 is in tight engagement with the radially outer surface of hose 16, and, the inner surface of the hose 16 is in liquid-tight engagement with the outer surface of the pipe end 18. These parts are shown with radial spacing for the purpose of clarity in the FIG. 2.

In the embodiment shown in FIG. 1, the clamp actuating member 10 has an extension 11 carrying a stack of Belleville washers 20, positioned between an end 22 of the housing 8 and a head 24 on the clamp actuating member 10. The Belleville washers 20 provide an axial force which acts to urge apart the end 22 and the head 24, that is, the head 24, extension 11 and actuating member 10 are urged to the left, in the view shown in FIG. 1, relative to the housing 8, thus drawing the second end 7 through the housing 8 by way of engagement between the screw threads 12 and the slots 14. Instead of the stack of washers a coil spring may be used. Before assembly upon a hose the clamp actuating member 10 is rotated to increase the diameter of the band until it can be slipped over the hose. Any force produced by spring 20 (if partly compressed) will be resisted by head 32 contacting the body at 30. The head 32 also prevents the various components of the hose clamp becoming separated. Member 10 is then rotated in the tightening direction to reduce the band diameter until it is in close contact with the hose. This is a similar procedure to that employed with conventional worm-drive hose clamps. Upon further rotation of the member 10 it will screw into the housing due to its screw engagement with band end 7. This motion will compress the Belleville washer stack 20 and produce tension in member 10 and in the band 4. Rotation is continued until sufficient tension is present in the band 4. Stack 20 is partially or fully compressed as desired by the user.

When the material of the hose creeps, tension in the band will be maintained because the Belleville washer stack 20 will flex and draw the member 10 to the left in FIG. 1 and draw the band end 7 with it thus taking up any slack in the band and maintaining tension therein (a tension that will change as the washer stack force changes on relaxation).

It will be understood that the improved hose clamp of the invention will be supplied for initial fitting with the Belleville washers held in a relaxed condition, and with the diameter of the circular configuration adequate to permit the band and slip it easily over an end of the hose 16, from right to left as seen in FIG. 2; alternatively however the band can be set to that required to secure the hose and a separate clamping tool such as pincers can be provided to press the Belleville washers together and thus increase the diameter of the band during initial assembly, and upon any subsequent disassembly. However, because the invention provides for automatic take up of any looseness in the fitting of the clamp band around a hose, the likelihood of subsequent leakage is greatly reduced and the need therefore for subsequent disassembly for clamp replacement minimised.

To reduce flexing of the Belleville washers, it is preferable to provide retention means to hold the end 22 and head 24 in their successively increased separated conditions. In this embodiment, extension 11 of the clamp actuating member 10 is serrated at 26, conveniently in the form of screw threads, or alternatively by spaced recesses or projections, and shaped for engagement by a sprag 28 mounted on end 22 of the housing 8. Thus axial movement, to the left as seen in FIG. 1, of the clamp actuating member 10 causes sprag 28 to ride over and then engage behind a serration. Preferably, sprag 28 is resilient mounted, so that it can be lifted clear of the serrations 26 whilst the clamp actuating member 10 is being repositioned in the housing 8, to the right as seen in FIG. 1, during reassembly of the fitting.

Support 28a is positioned between the sprag 28 and the stack of Belleville washers 20, to prevent the Belleville washers from interfering with the action of the sprag 28. To facilitate manual rotation, the head 24 may have a hexagonal head 34, and/or a screwdriver slot 36.

Support 28a is positioned between the sprag 28 and the stack of Belleville washers 20, to prevent the Belleville washer from interfering with the action of the sprag 28. To facilitate manual rotation one end of the clamp actuating member 10 has a hexagonal head 34, and/or screwdriver slot 36.

In a preferred version of the device, the serrations 26 are made in the form of a screw thread which may be multistart. Rotation of the member 10 allows it to advance into the housing 8 thus compressing the Belleville washers 20 notwithstanding that the ratchet serrations 26 prevent motion in that direction (except when accompanied by rotation). When the Belleville washers are sufficiently compressed the sprags will "click" over the thread-like serrations 26 if rotation of member 10 is continued. Means, not shown, are required to prevent the sprag 28 rotating with the member 10.

To loosen the hose clamp, member 10 is rotated in the opposite direction. This advances the member 10 toward the left as it winds through the sprag 28 until the sprag teeth are clear of the serrations 26 in the groove 26a. Further rotation will allow the band 14 to be slackened without further axial motion of the member 10.

Figure 3:
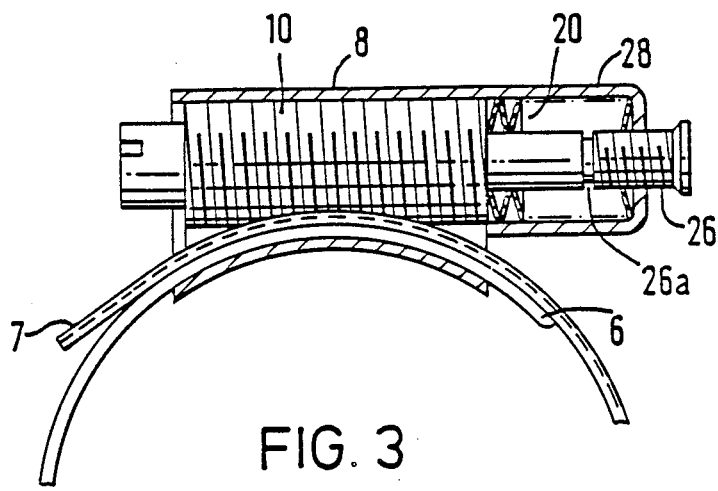
FIG. 3 is an end elevation of a second embodiment of the invention.

In an alternative embodiment, shown in FIG. 3, the stack of Belleville washers 20 and sprag 28 can be located within the housing 8 to protect them from contamination by dirt and corrosion. The stack of Belleville washers 20 apply an axial force to move the clamp actuating member 10 to the left, as seen in FIG. 3, and the housing to the right. The serrations 26 and the groove 26a are on the extension spindle as shown.

Figure 4:
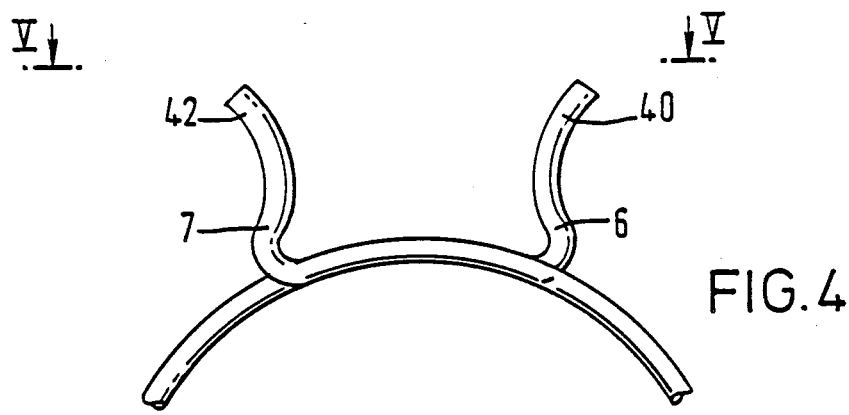
FIG. 4 is an end elevation of a third embodiment of the invention utilising a wire loop with upstanding lugs.
Figure 5:
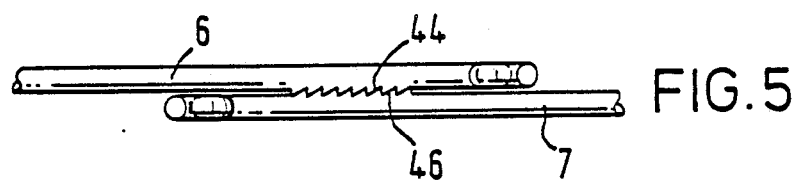
FIG. 5 is a view in the direction V—V shown in FIG. 4.

In another embodiment of the invention, shown in FIGS. 4 and 5, a hose clamp comprises a metallic wire loop having first end 6 and second end 7 which are provided with outturned lugs 40,42. In this embodiment the tightening of the band 20 is provided by the material of the band itself. The ends lugs 40,42 must be forced together during assembly to enlarge the diameter of the hose clamp. Once in position the lugs are released and the band flexes inwardly into tight contact with the hose. A ratchet is provided by teeth 44,46 formed on contiguous overlapping portions of first and second ends 6,7, the ratchet being disengaged for disassembly by lateral separation of the ratchet teeth.

FIG. 6 of the drawings is of another generally known design of hose clamp to which this invention may be applied, and comprises upstanding ears 40,42 which are drawn together to tighten the clamp around a hose. Actuating member 10 is in the form of a headed and threaded stem, with fixed head 52 in abutment with ear 42 and an adjustable head 50 in abutment with ear 40, adjustable head 50 being slidably mounted on the stem 10. Also slidably mounted on the stem is a stack of Belleville washers 20 or the equivalent, located between nut 54 and sprag 28, the sprag being backed by head 50. Sprag 28 is in engagement with the screw threads 11 on the stem such that is can be moved to the right, as seen in FIG. 6, along the stem, i.e. in the hose clamping direction, but engages the threads 11 to prevent movement to the left along the stem.

Initially the nut 54, Belleville washer stack 20, spray 28 and ear 40 will be to the left end of the stem as seen in FIG. 6, so that the clamp can be easily slid over the hose; the nut 54 is then rotated to move ear 40 via the Belleville washer stack and the sprag 28 to tighten the clamp around the hose; further rotation of the nut 54 will compress the Belleville washer stack 20 without movement of spray 28, and the mentioned parts remain in this relative position until spray 28 is driven to the right by the Belleville washer stack 20 should the material creep from below the clamp, such that the clamp loading falls below the axial compressive loading from stack 20.

If it is required to loosen the hose clamp the spray 28 can be screwed to the left by relative rotation between the sprag 28 and the member 10, thus allowing the actuating member 10 to be unscrewed through the spray with movement of the head 52 and the ear 42 to the right as seen in FIG. 6 to loosen the clamp for disassembly.

It will be understood that in use, the spray 28 acts as a one-way clutch to prevent the ears 40,42 separating, as upon increase in hose internal pressure, and which might otherwise occur if the separating force exceeded the available compressive force from the stack of Belleville washers 20, with possible leakage of the hose contents.

The embodiment of FIG. 7 is generally similar to that of FIG. 6 except that the actuating member 10 is rotatable by head 54a; upstanding ears 40,42 are abutted by heads 52,52a respectively, head 50 being slidably mounted on the stem of the actuating member 10 whilst the head 52a is a nut which can be rotated relative to head 54a. Sprag 28 also engages in the screw threads 11, to act as a one-way clutch or pawl and ratchet.

In another embodiment, shown in FIG. 8, first clamp end 6 carries a housing 8, and rotational actuating member 60 upon which second end 7 is wound. In this embodiment the clamp can be tightened by a torsion spring. Thus the clamp loading is initially set by rotation of the member 60 until end 7 has been sufficiently wound round member 8 or an extension thereof. Member 60 has screw-driver slot 62; further rotation of member 60 in the applying direction induces torsion in the spring which can subsequently unwind should the clamp pressure drop, to rotate member 60, thereby to maintain the clamp pressure by winding-on more of the second end 7.

If required, housing 8 can have a ratchet engageable by a pawl carried by member 60, so as to permit relative rotation of member 60 and housing 8 in the winding-on direction of second end 7 to prevent inadvertent unwinding or loosening of the clamp as upon increased hose internal pressure.

The clamp actuating member 10 of the invention can also be used to draw together the ears of a one piece flexible plastics band, for instance as described in British Pat. No. 1,388,681—or in the converse, to separate the ears.

The clamp may utilise a so-called "memory alloy" obtained from Memory Metals Limited of England. This alloy can be programmed to change its shape in response to changes in temperature and so can be used to tighten the clamp each time the temperature is cycled and so cycled and so may be used instead of the axial compression spring or Belleville washer stack 20 in the previously described embodiments. Alternatively, as illustrated in FIG. 9, a rod 58 of the memory metal is programmed to give torsional motion between its ends. For example, when the assembly cools, the rod 58 rotates end 60 relative to end 62 so as to tighten the band 7, end 62 being held stationary by the ratchet 70, for instance, a wrap-clutch as shown in the drawing. Next time the assembly is heated, the end 62 of the rod 58 rotates in the opposite direction with respect to end 60 and rotates within the ratchet ready for the next cooling cycle.

In each of the embodiments described above the band 4 is shown as making approximately one turn. This invention may also be usefully applied with the band making multiple turns around the hose. Whilst friction between the turns is likely to necessitate a greater force to tighten the hose clamp than if no friction from the additional turns were present, such friction will act however to resist any subsequent tendency to increase the diameter "d" due to pressure within the hose and will thus act in the same manner as the ratchet 28.

I claim:
1. A hose clamp to clamp an overlapping junction between a hose and a pipe end extending into the hose, the hose clamp comprising:
   a loop to encircle and clamp against the hose in pressure engagement therewith, the loop having first and second ends, with the first end overlapping the second end;
   holding means connected to the second end of the loop and engaging the first end thereof to hold said ends together in said overlapping relation; and
   adjusting means connected to the holding means and acting in response to a relaxation of the loop to force the holding means to move the first end of the loop relative to the second end of the loop to help maintain a preset pressure between the loop and the hose;
   the adjusting means including
   (i) a rod connected to the holding means and supported for movement along an axis, wherein linear movement of the rod in a first axial direction forces the holding means to move the first end of the loop away from the second end thereof, and
   (ii) spring means engaging said rod and urging the rod in said first direction;
   wherein the holding means includes a sprag means mounted on and engaging the rod, the spray means restricting linear movement of the rod in said first direction when the pressure of the loop against the hose is below the preset pressure to allow the force of the spring means against the rod to increase to a given level.

2. A hose clamp, as claimed in claim 1, in which the holding means further includes a ratchet.

3. A hose claim, as claimed in claim 1, in which the first and second ends of the loop have radially outturned lugs.

4. A hose clamp, as claimed in claim 1 or claim 2, wherein the holding means comprises a generally toothed, sprocketed or like track on the first end of the loop, and a worm-drive oriented longitudinally along the loop and engaging the track.

5. A hose clamp, as claimed in claim 4, wherein the holding means includes a housing fixed to the second loop end, the worm drive is within and free to move relative to the housing and the spring means acts on the worm-drive urging separation of worm-drive and housing thereby to urge tightening of the loop.

6. A hose clamp, as claimed in claim 5, in which the spring means is a stack of Belleville washers.

7. A hose clamp, as claimed in claim 5, in which the spring means is a rod or bar of memory alloy having the tendency to alter shape in response to changes in temperature.

8. A hose clamp, as claimed in claim 5, in which the spring means is a compression spring.

9. A hose clamp, as claimed in claim 4, in which the holding means comprise a housing fixed to the second loop end, the worm drive is within and free to move relative to the housing and operatively attached to the worm drive via a one-way clutch a rod or bar of memory alloy having the tendency to twist axially between its ends in response to temperature change.

10. A hose clamp according to claim 1, wherein:
the holding means includes a housing connected to the second end of the loop and;
the sprag means is mounted on the rod and is axially captured between the housing and the spring means.

11. A hose clamp according to claim 10, wherein:
the rod extends into and is supported for movement in said housing;
the holding means further includes first and second sets of threads on the rod, the first set engaging the first end of the loop, the second set threads engaging the sprag means; and
the sprag means allows linear movement of the rod in said first direction when the pressure of the spring means against the rod rises above said given level.

* * * * *

UNITED STATES PATENT AND TRADEMARK OFFICE
CERTIFICATE OF CORRECTION

PATENT NO. : 4,819,307

DATED : April 11, 1989

INVENTOR(S) : David L. Turner

It is certified that error appears in the above-identified patent and that said Letters Patent is hereby corrected as shown below:

Column 1, line 22: "an" should read as --and--
Column 2, line 67: "ad" should read as --and--
Column 5, line 7: "spray" should read as --sprag--
Column 5, line 14: "spray" should read as --sprag--
Column 5, line 15: "spray" should read as --sprag--
Column 5, line 20: "spray" should read as --sprag--
Column 5, line 23: "spray" should read as --sprag--
Column 5, line 27: "spray" should read as --sprag--
Column 6, line 53, Claim 1: "spray" should read as --sprag--
Column 6, line 61, Claim 3: "A hose claim" should read as --A hose clamp--

Signed and Sealed this

Thirtieth Day of April, 1991

Attest:

HARRY F. MANBECK, JR.

Attesting Officer

Commissioner of Patents and Trademarks